(12) United States Patent
Choo

(10) Patent No.: US 6,452,362 B1
(45) Date of Patent: Sep. 17, 2002

(54) APPARATUS AND METHOD FOR CONTROLLING POWER SUPPLY TO A BATTERY-POWERED ELECTRONIC DEVICE

(75) Inventor: Yeon-Chul Choo, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 56 days.

(21) Appl. No.: 09/627,301

(22) Filed: Jul. 27, 2000

(30) Foreign Application Priority Data

Jul. 27, 1999 (KR) .............................. 99-30675

(51) Int. Cl.[7] ................................. H02J 7/00
(52) U.S. Cl. ........................ 320/116; 320/124
(58) Field of Search .................. 320/116, 118, 320/121, 124, 132, 136

(56) References Cited

U.S. PATENT DOCUMENTS

| | | | |
|---|---|---|---|
| 4,140,957 A | 2/1979 | Rapp | 320/106 |
| 5,179,337 A | 1/1993 | Staarman et al. | 320/136 |
| 5,239,495 A | 8/1993 | Nanno et al. | 713/321 |
| 5,300,874 A | 4/1994 | Shimamoto et al. | 320/106 |
| 5,355,071 A | 10/1994 | Ishida et al. | 320/110 |
| 5,355,073 A | 10/1994 | Nguyen | 320/116 |
| 5,359,318 A | 10/1994 | Asai et al. | 320/114 |
| 5,383,140 A | 1/1995 | Nanno et al. | 713/321 |
| 5,455,562 A | 10/1995 | Chin | 340/547 |
| 5,477,123 A | 12/1995 | Allen et al. | 320/124 |
| 5,477,124 A | 12/1995 | Tamai | 320/135 |
| 5,485,073 A | 1/1996 | Kasashima et al. | 320/106 |
| 5,547,775 A | 8/1996 | Eguchi et al. | 320/118 |
| 5,553,294 A | 9/1996 | Nanno et al. | 713/340 |
| 5,581,772 A | 12/1996 | Nanno et al. | 713/340 |
| 5,598,041 A | 1/1997 | Willis | 307/43 |
| 5,621,301 A | 4/1997 | Allen et al. | 320/124 |
| 5,629,602 A | 5/1997 | Makino | 320/107 |
| 5,646,503 A | 7/1997 | Stockstad | 320/135 |
| 5,652,499 A | 7/1997 | Morita et al. | 320/112 |
| 5,818,200 A | * 10/1998 | Cummings et al. | 320/116 |
| 5,867,007 A | * 2/1999 | Kim | 320/118 |
| 5,955,797 A | 9/1999 | Kim | 307/150 |
| 5,986,437 A | 11/1999 | Lee | 320/162 |
| 6,218,643 B1 | * 4/2001 | Iwata et al. | 219/202 |

* cited by examiner

*Primary Examiner*—Bao Q. Vu
*Assistant Examiner*—Lawrence Luk
(74) *Attorney, Agent, or Firm*—Robert E. Bushnell, Esq.

(57) ABSTRACT

A battery-powered electronic device having a main battery and a second battery, and method for controlling power supply to a battery-powered electronic device, are described. If the two batteries are simultaneously mounted in the electronic device, the electronic device receives power from the battery having a relatively higher voltage level in advance of receiving power from the other battery. When the voltage levels of the two batteries are substantially identical to each other, as the one battery is discharged, the other battery is also simultaneously discharged.

22 Claims, 3 Drawing Sheets

APPARATUS AND METHOD FOR CONTROLLING POWER SUPPLY TO A BATTERY-POWERED ELECTRONIC DEVICE

CLAIM OF PRIORITY

This application makes reference to, incorporates the same herein, and claims all benefits accruing under 35 U.S.C. §119 from my application BATTERY POWERED ELECTRONIC DEVICE AND POWER SUPPLYING CONTROL METHOD THEREOF filed with the Korean Industrial Property Office on Jul. 27, 1999 and there duly assigned Ser. No. 30675/1999.

BACKGROUND OF INVENTION

1. Field of the Invention

The present invention relates to battery-powered electronic devices, and more particularly to apparatus and methods for controlling a power supply to battery-powered portable electronic devices.

2. Background of the Invention

Portable electronic devices, such as portable computers, camcorders, mobile phones, cassette tape recorders and other devices, operate with batteries. Typically, these devices are also capable of using AC (alternating current) power. Battery power is used when AC power is not convenient or not available. Most battery-powered electronics have circuitry for displaying the remaining capacity of a battery to a user. If the remaining battery capacity is less than a preset value, the user is warned of a low battery condition.

A successive use time of a battery-powered portable electronic device is very important. Some portable electronic devices each have two batteries in order to extend the use time thereof. Either one or both of the two batteries can be mounted on such devices. Also, some recent portable stereo cassette tape players permit a combined and simultaneous use of both a non-rechargeable primary battery and a rechargeable secondary battery.

Upon using such an electronic device to accommodate two batteries, when a first battery is discharged, a user may mount a second battery on the device without removing the first discharged battery in order to prolong the usage time of the device. In this case, the usage time of the second battery will lessen since the voltage levels of the two batteries are different from each other so that a relatively higher voltage level of the second battery is rapidly lowered to a relatively lower voltage level of the first battery.

An example of portable electronic devices operating with two batteries is disclosed in U.S. Pat. No. 5,867,007 to Kim entitled Selection Circuit for Dual Batteries in a Battery Powered Electronic Device. Kim '007 discloses a battery selection circuit for dual battery packs. The battery selection circuit includes a battery detector for sensing the existence of the first and second battery packs and for producing the detect signals corresponding thereto. These detect signals are provided to a microcontroller to produce first and second battery discharge enable signals. In response to the first and second battery discharge enable signals, first and second electronic switches respectively connect each power supply line from the first and second batteries to a power supply circuit of the device.

U.S. Pat. No. 5,477,123 to Allen et al. entitled Connection Multiple Batteries to Battery Powered Devices, discloses a circuit for serially connecting multiple batteries to a battery-powered device so that the device will serially charge or discharge the batteries. The device includes at least two controllable switch circuits for selectively connecting batteries to the battery-powered device, a power flow sensor for sensing power flow from the device to the selected battery or vice-versa, and a selector circuit for sequentially enabling the switch circuits to sequentially connect the batteries to the battery-powered device so that the batteries will sequentially charge or discharge.

U.S. Pat. No. 5,485,073 to Kasashima et al. entitled Personal Computer for Performing Charge and Switching Control of Different Types of Battery Packs, discloses a personal computer having a battery pack mounting section for detachably receiving battery packs having different current capacities. It is disclosed when the PC-CPU detects that the currently used battery pack is in a low-battery state, it selects the other battery pack to supply the operating power to the personal computer.

U.S. Pat. No. 5,621,301 to Allen et al. entitled Connecting Multiple Batteries to Battery Powered Devices, discloses a circuit serially connecting multiple batteries to a battery-powered device so that the device will serially charge or discharge the batteries. The device includes at least two controllable switch circuits for selectively connecting batteries to the battery-powered device, a power flow sensor for sensing power flow from the device to the selected battery or vice-versa, and a selector circuit for sequentially enabling the switch circuits to sequentially connect the batteries to the battery-powered device so that the batteries will sequentially charge or discharge.

U.S. Pat. No. 5,646,503 to Stockstad entitled Method for Balancing Power Sources and Structure Thereof discloses a power source balancing circuit that balances two power sources such as two battery cells. When the power source balancing circuit is enabled, it compares a current flowing through the first battery cell and a first resistor with a current flowing through the second battery cell and a second resistor. If a current difference larger than a predetermined limit is detected, the battery cell with a higher voltage is discharged through a corresponding discharge resistor by switching on a corresponding switch.

U.S. Pat. No. 4,140,957 to Rapp entitled Calculator Driving and Battery Pack Recharging Circuit, discloses a circuit to drive an electronic calculator from a source of ac power or, alternately, from either one of a plurality of disposable batteries or a unique, rechargeable battery pack. When disposable batteries are deposited inside the battery compartment of the calculator and an ac adapter accessory is connected to provide power to the calculator, the disposable batteries are electrically isolated from the ac source, and when the rechargeable battery pack is deposited inside the battery compartment of the calculator and the ac adapter is connected to provide power to the calculator, the battery pack is recharged.

U.S. Pat. No. 5,300,874 to Shimamoto et al. entitled Intelligent Power Supply System for a Portable Computer, discloses a power supply system for a portable computer, the computer having a central processing unit (CPU), and being operable in response to power supplied from at least two chargeable batteries or an alternating current (AC) adapter, includes means for detachably coupling the batteries to the computer and a PC-CPU for controlling power supply independent of the CPU. The PC-CPU has means for receiving battery select information for controlling power supply and generating a control signal. The power supply system further includes battery control circuit means, connected to the AC adapter and the batteries, for selecting and controlling the AC adapter or one of the batteries based on the control signal.

U.S. Pat. No. 5,986,437 to Lee entitled Power Supply System for Portable Electronic Devices, discloses a power supply system for a portable device such as potable personal computer, to be operated from a DC power source supplied from a rechargeable battery or an AC adapter. The power supplying system includes an input current detecting circuit for detecting an input current supplied from the AC adapter and for generating a detection signal having a magnitude which varies depending upon the input current and a charging current control circuit for controlling the amount of the charging current in response to the detection signal.

Also, of interest in relation to supplying power to a battery powered electronic device are: U.S. Pat. No. 5,179,337 to Staarman et al. entitled Over-Discharge Protection for Rechargeable Batteries; U.S. Pat. No. 5,355,071 to Ishida et al. entitled Power Source Apparatus for Vehicles; U.S. Pat. No. 5,359,318 to Asai et al. entitled Hand-Held Electronic Apparatus Using Two Batteries Sequentially Supplying Current to Inductive Element; U.S. Pat. No. 5,477,124 to Tamai entitled Circuit to Prevent Excessive Rechargeable Battery Discharge; U.S. Pat. No. 5,547,775 to Eguchi et al. entitled Circuit for Preventing Overcharge and Over discharge of Secondary Batteries, U.S. Pat. No. 5,553,294 to Nanno et al. entitled Portable Computer Powered by Rechargeable Batteries; U.S. Pat. No. 5,598,041 to Willis entitled Efficient Fault Tolerant Switching Circuit for Redundant D.C. Power Supplies; U.S. Pat. No. 5,629,602 to Makino entitled Portable Electronic Equipment with Attachment for Supplying Power and Charging Battery; U.S. Pat. No. 5,652,499 to Morita et al. entitled Power Supply Apparatus to Provide Power to Electrical Equipment from a Plurality of Battery Packs and Its Method of Power Supply; U.S. Pat. No. 5,239,495 to Nanno et al. entitled Power Supply Control System for a Portable Computer; U.S. Pat. No. 5,355,073 to Nguyen entitled Battery Pack Sensor for an AC Adapter; U.S. Pat. No. 5,383,140 to Nanno et al. entitled Power Supply Control System for a Portable Computer; U.S. Pat. No. 5,455,562 to Chin entitled Home Intruder Indicator 2; U.S. Pat. No. 5,581,772 to Nanno et al. entitled Power Supply Control System for a Portable Computer; and U.S. Pat. No. 5,955,797 to Kim entitled Portable Computer Being Powered by Either a Battery Pack or an AC Adapter.

SUMMARY OF THE INVENTION

Therefore, it is an object, among other objects, of the present invention to provide an electronic device simultaneously accommodating two batteries, which is capable of maximizing the usage time of the batteries.

According to an aspect of the invention, when voltage levels of two batteries mounted in an electronic device are different, one battery having a relatively higher voltage level is discharged in advance of the other battery. Thereafter, when the two batteries have the same voltage levels, they are simultaneously discharged.

In a preferred embodiment, among embodiments, of the present invention, an electronic device includes a power input terminal for supplying power to a main circuit of the electronic device, a first battery and a second battery, a battery control circuit for generating a battery selection control signal in response to output voltages of the first battery and the second battery, and a battery selection circuit for electrically connecting one of the two batteries that has a relatively higher voltage level to the power input terminal in response to the battery selection control signal.

The battery selection circuit includes a first switch circuit and a second switch circuit. The first switch circuit is connected between the first battery and the power input terminal, and is selectively turned on and off in response to the battery selection control signal. The second switch circuit is connected between the second battery and the power input terminal, and is selectively turned on and off in response to the battery selection control signal. The first switch circuit and the second switch circuit are alternatively, or selectively, turned on and off.

The electronic device further includes an AC (alternating current) adapter for supplying power to the power input terminal, and an adapter detection circuit. The battery selection circuit further includes a third switch circuit connected to the power input terminal and between the first switch circuit and the second switch circuit. The adapter detection circuit detects whether the AC adapter is connected to the power input terminal, and generates an adapter detection signal when the AC adapter is connected to the power input terminal. The third switch circuit is selectively turned on and off in response to the adapter detection signal. When the AC adapter is connected to the power input terminal, the first and second switch circuits are turned off in response to the adapter detection signal.

The electronic device further includes a battery voltage detection circuit connected to the first and second batteries. When an output voltage of the first battery or the second battery is below a preset value, the battery voltage detection circuit generates a low voltage detection signal, and then supplies it to the main circuit.

The battery voltage detection circuit includes a low voltage detection circuit for generating the low voltage detection signal when an input voltage level at a voltage input terminal to the low voltage detection circuit is lower than a predetermined level, a first diode connected to both the voltage input terminal of the low voltage detection circuit and the first battery, and a second diode connected to the voltage input terminal of the low voltage detection circuit and the second battery.

The battery control circuit includes a first voltage divider for dividing an output voltage of the first battery, a second voltage divider for dividing an output voltage of the second battery, and a comparator for comparing an output of the first voltage divider with an output of the second voltage divider to generate the battery selection control signal.

According to another aspect, among aspects, of the present invention, in a battery-powered electronic device having a first battery and a second battery, it is determined whether the first and second batteries are simultaneously mounted on or electrically connected to the electronic device. If only one of the first and second batteries is mounted on or electrically connected to the device, the electronic device is supplied with power from the mounted or connected battery. When the first and second batteries are mounted on or electrically connected to the electronic device, it is determined whether output voltages of the first and second batteries are different from each other. If so, the electronic device is supplied with power from one of the two batteries that has a relatively higher output voltage. If the output voltages of the first and second batteries are same, the electronic device is supplied with power from both the first and the second batteries. When an AC adapter is connected to the electronic device, power supplied from any of the first battery and the second battery to the electronic device is cut off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

A battery-powered electronic device of the invention has or can utilize, for example, two batteries. If two batteries are simultaneously mounted on or electrically connected to the electronic device, a battery having a relatively higher voltage level is discharged prior to the other battery having a relatively lower voltage level. If voltage levels of two batteries are substantially identical, the two batteries are discharged at the same time.

Figure 1:
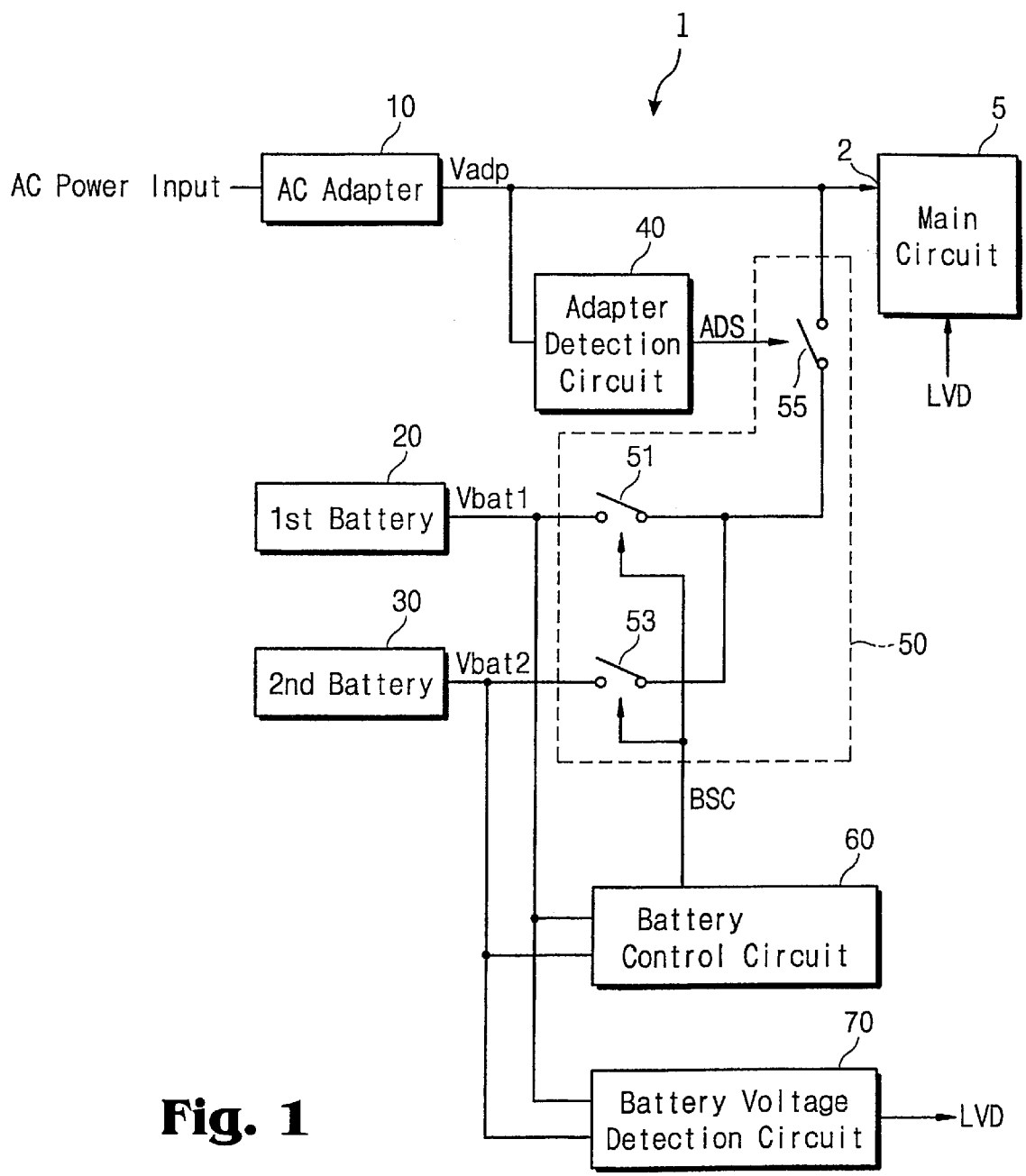
FIG. 1 is a block diagram for schematically showing a battery-powered electronic device in accordance with the invention.

FIG. 1 schematically illustrates a battery-powered electronic device 1 in accordance with the present invention. Referring now to FIG. 1, the battery-powered electronic device 1 includes a main circuit 5, a first or main battery 20, and a second or auxiliary battery 30. A battery selection circuit 50 is connected between the first and second batteries 20 and 30 and to a power input terminal 2 of the main circuit 5. The battery selection circuit 50 includes three switch circuits 51, 53, and 55.

A battery control circuit 60 is connected to both the first battery 20 and the second battery 30 and supplies a battery selection control signal BSC to the battery selection circuit 50. A battery voltage detection circuit 70 is connected to the first and second batteries 20 and 30. An AC adapter 10 is also provided for the electronic device. An adapter detection circuit 40 detects the connection of the AC adapter 10 to the electronic device 1.

The battery control circuit 60 outputs the battery selection control signal BSC in response to the output voltages of the first and second batteries 20 and 30. The circuit 60 compares voltages levels of the batteries 20 and 30 and outputs the battery selection control signal BSC so that a battery of the first and second batteries 20 and 30 having a relatively higher voltage level can electrically be connected to the power input terminal 2. When detecting the connection of the AC adapter 10 to the electronic device 1, the adapter detection circuit 40 generates an adapter detection signal ADS.

The first switch circuit 51 is connected between the first battery 20 and the power input terminal 2, and the second switch circuit 53 is connected between the second battery 30 and the power input terminal 2. The first and second switch circuits 51 and 53 are alternatively, or selectively, turned on and off in response to the battery selection control signal BSC. The third switch circuit 55 is connected between the first and second switch circuits 51 and 53 and to the power input terminal 2, and is selectively turned on and off in response to the adapter detection signal ADS.

When the batteries 20 and 30 are simultaneously mounted in the device, the main circuit 5 is supplied with power from a battery of batteries 20 and 30 having a relatively higher voltage level in advance of power being supplied from the other of the batteries 20 and 30. If the AC adapter 10 is connected to the power input terminal 2, in order to supply power to the main circuit 5, the adapter detection circuit 40 cuts off a battery power supply from any of the first and second batteries 20 and 30 to the main circuit 5 by switching off the third switch circuit 55.

When a voltage level of one battery of batteries 20 and 30 having a relatively higher voltage level is lower than a preset level or a preset value, the battery voltage detection circuit 70 generates a low voltage detection signal LVD and then provides it to the main circuit 5. In response to the signal LVD, the main circuit 5 warns a user of a low battery status.

Figure 2:
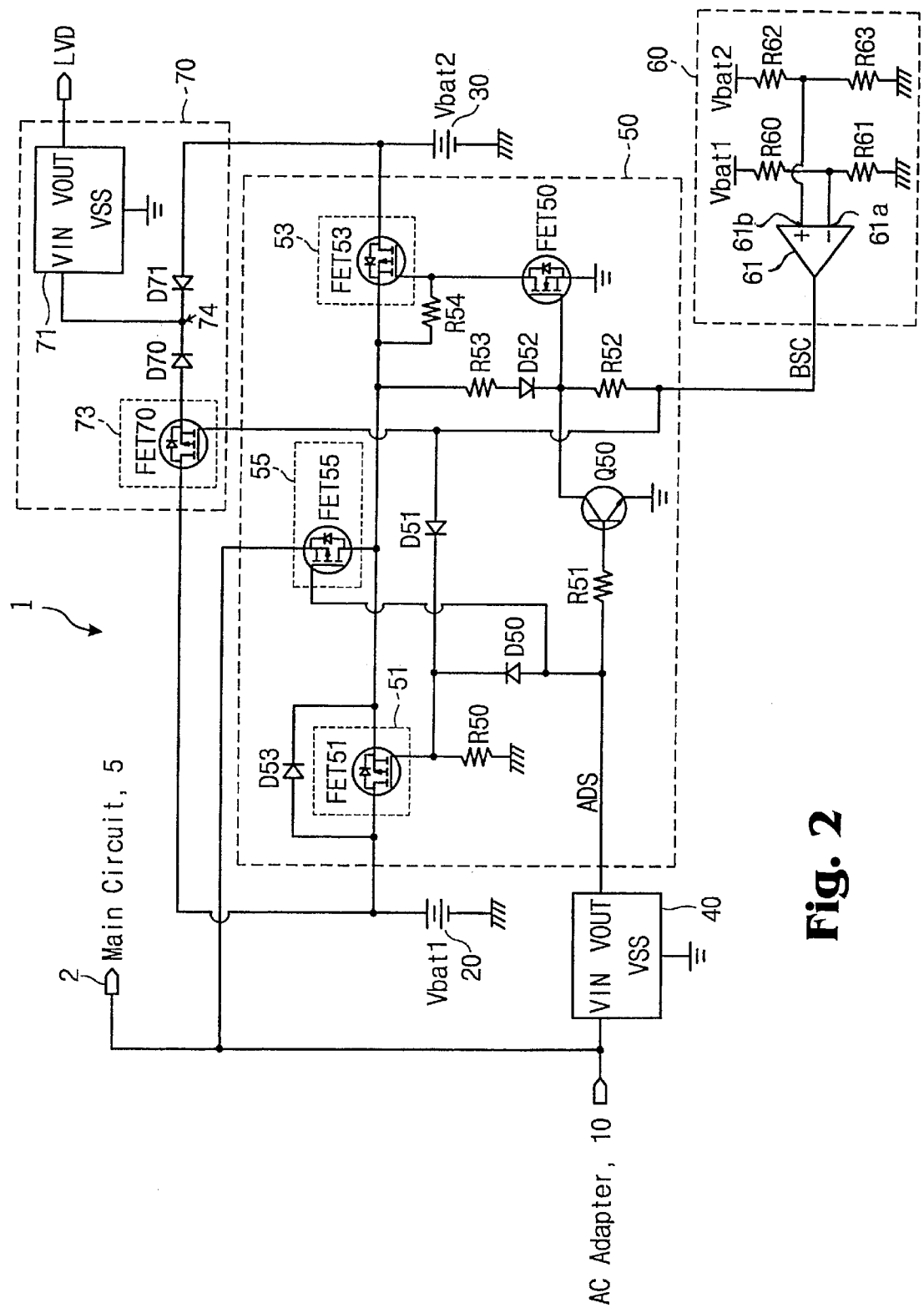
FIG. 2 is a detailed circuit diagram of a battery selection circuit, a battery control circuit, and a battery voltage detection circuit shown in FIG. 1 in accordance with the present invention.

FIG. 2 is a detailed circuit diagram of the battery-powered electronic device 1 illustrating battery selection circuit 50, battery control circuit 60, and battery voltage detection circuit 70 shown in FIG. 1. Referring to FIG. 2, the battery control circuit 60 includes a comparator 61 and resistors R60, R61, R62, and R63. The resistors R60 and R61 are connected in series between an output voltage Vbat1 of the first battery 20 and a reference voltage (e.g., a ground voltage), and divide the voltage Vbat1. A first divided voltage from the resistors R60 and R61 corresponding to the first battery 20 is provided to an inverting input terminal 61a of the comparator 61. The resistors R62 and R63 are connected in series between an output voltage Vbat2 of the second battery 30 and the reference voltage. A second divided voltage corresponding to the second battery 30 from the resistors R62 and R63 is provided to a non-inverting input terminal 61b of the comparator 61. The resistors R60–R63 desirably have the same resistance value, such as 150 KΩ, for example. This allows one battery of the batteries 20 and 30 having a relatively higher voltage level to be discharged prior to the other battery of the batteries 20 and 30 having a relatively lower voltage level, and allows two batteries 20 and 30 each with the same voltage level to be discharged simultaneously.

The comparator 61 compares the first divided voltage corresponding to the first battery 20 with the second divided voltage corresponding to the second battery 30 and selectively generates battery selection control signal BSC having a logic high level or a logic low level depending upon the comparison result of comparing the first divided voltage with the second divided voltage. When the first divided voltage is higher than the second divided voltage, the comparator 61 generates the battery selection control signal BSC of the logic low level. When the first divided voltage is lower than or equal to the second divided voltage, the comparator 61 generates the battery selection control signal BSC of the logic high level.

The adapter detection circuit 40 includes a voltage detector, such as illustrated in FIG. 2. If the AC adapter 10 is connected to the power input terminal 2 of the main circuit 5, the adapter detection circuit 40 detects this connection of the AC adapter 10 and generates the adapter detection signal ADS of a high level.

Continuing with reference to FIG. 2, the battery selection circuit 50 includes the first through third switch circuits 51, 53 and 55. The first switch circuit 51 and the second switch circuit 53 are connected in series between the first battery 20 and the second battery 30. The third switch circuit 55 is connected between the power input terminal 2 of the main circuit 5 and an interconnection of the first and second switch circuits 51 and 53. Each of the switch circuits 51, 53, and 55 includes, for example, a P-channel metal oxide semiconductor field effect transistor (MO SFET); namely, first switch circuit 51 is implemented by FET51, second switch circuit 53 by FET53, and third switch circuit 55 by FET55, functioning as the respective switches.

The battery selection circuit 50 further includes resistors R50, R51, R52, R53, and R54, diodes D50, D51, D52, and D53, an NPN bipolar transistor Q50, and an N-channel MOSFET FET50. Anode and cathode electrodes of the diode D53 are connected to source and drain electrodes of the transistor FET51, respectively. A gate terminal of the transistor FET51 is connected to the ground voltage through the resistor R50, and to the adapter detection signal ADS through the diode D50, and to the battery selection control signal BSC from the battery control circuit 60 through the diode D51. A gate of a transistor FET55 is connected to receive the adapter detection signal ADS. The resistor R51 is connected between the adapter detection circuit 40, which provides the adapter detection signal ADS, and a base of the transistor Q50. An emitter of the transistor Q50 is grounded, and a collector of transistor Q50 is connected to the battery selection control signal BSC through the resistor R52.

A source-drain current path of the transistor FET50 is connected between a gate of the transistor FET53 and the ground voltage, and a gate of transistor FET50 is connected to receive the battery selection control signal BSC through the resistor R52. The resistor R53 and the diode D52 are connected between the gate of the transistor FET50 and a drain of a transistor FET53. The resistor R54 is connected between the drain and the gate of the transistor FET53.

Continuing with reference to FIG. 2, when the AC adapter 10 is connected to the power input terminal 2 and the adapter detection signal ADS of a high level is generated by the adapter detection circuit 40, all the first to third switch circuits 51, 53, and 55 (i.e., FET51, FET53, and FET55) are turned off so as to cut off the power supply from any of batteries 20 and 30 to the power input terminal 2 of the main circuit 5.

When the AC adapter 10 is not connected to the power input terminal 2, the third switch circuit 55 (or FET55) is turned on because the signal ADS from the circuit 40 goes to a low level. In this case, if the first battery 20 is solely mounted on or connected to the electronic device 1, the battery control circuit 60 outputs the battery selection control, signal BSC of a low level. The first switch circuit 51 (or FET51) is turned on in response to the battery selection control signal BSC of a low level, so that the first battery 20 is electrically connected to the power input terminal 2 through the third switch circuit 55 (or FET55) and the first battery voltage Vbat1 from first battery 20 is supplied to the main circuit 5. Transistor FET50 is turned off in response to the low level battery selection control signal BSC, so that the second switch circuit 53 (or FET53) is turned off.

When the second battery 30 is solely mounted on the electronic device 1, the battery control circuit 60 outputs the battery selection control signal BSC of a high level. Then, the first switch circuit 51 (or FET51) is turned off and the second switch circuit 53 (or FET53) is turned on, so that the second battery 30 is electrically connected to the terminal 2 through the third switch circuit 55 (or FET55) and the second battery voltage Vbat2 from second battery 30 is supplied to the main circuit 5.

When both the first battery 20 and the second battery 30 are installed in or electrically connected to the electronic device 1, the battery control circuit 60 compares the first battery voltage Vbat1 with the second battery voltage Vbat2 and generates the battery selection control signal BSC in accordance with the comparison result of comparing the first battery voltage Vbat1 with the second battery voltage Vbat2, so that one battery of the first and second batteries 20 and 30 having a relatively higher voltage level can electrically be connected to the power input terminal 2. When the voltage Vbat1 is relatively higher than the voltage Vbat2, the battery control circuit 60 generates the battery selection control signal BSC of a low level. In contrast, when the voltage Vbat1 is relatively lower than or relatively equal to the voltage Vbat2, the battery control circuit 60 generates the battery selection control signal BSC of a high level.

Continuing with reference to FIGS. 1 and 2, when the second battery voltage Vbat2 corresponding to second battery 30 is relatively higher than the first battery voltage Vbat1 corresponding to first battery 20, the second switch circuit 53 (or FET53) is turned on and so the second battery 30 is discharged. As the second battery 30 is continuously discharged, when the output voltage level Vbat2 of the second battery 30 is relatively identical with the output voltage level Vbat1 of the first battery 20, from this time, the first battery 20 is then also discharged through the diode D53 together with the second battery 30.

Referring to FIG. 2, the battery voltage detection circuit 70 includes a low voltage detector 71, diodes D70 and D71, and a fourth switch circuit 73, as well as including a voltage input terminal 74 for the low voltage detector. The fourth switch circuit 73 includes a P-channel MOS transistor FET70. A source-drain current path of the transistor FET70 is connected between the first battery 20 and an anode of a diode 70, of which a cathode is connected to the low voltage detector 71 through voltage input terminal 74. A gate of the transistor FET70 is connected to receive to the battery selection control signal BSC.

The battery voltage detection circuit 70 detects output voltages of the first and second batteries 20 and 30. When the battery selection control signal BSC is at a low level (i.e., when the voltage Vbat1 at the first battery 20 is relatively higher than the voltage Vbat2 of the second battery 30), the fourth switch circuit 73 (FET73) is turned on. The low voltage detector 71 generates a low voltage detection signal LVD when the output voltage Vbat1 of the first battery 20 is lower than a predetermined voltage. When the battery selection control signal BSC is at a high level (i.e., when the voltage Vbat1 of the first battery 20 is lower than or equal to the voltage Vbat2 of the second battery 30, the fourth switch circuit 73 (FET73) is turned off. The low voltage detector 71 also generates a low voltage detection signal LVD when the output voltage Vbat2 of the second battery 30 is lower than the predetermined voltage.

It should also be noted that, according to the present invention, it is possible to determine the discharge priority of the two batteries 20 and 30 by controlling the resistance values of the resistors R60–R63 of the battery control circuit 60. For example, if resistors R60, R61 and R62 each are 150 KΩ and resistor R63 is 220 KΩ, the second battery 30 will be discharged prior to the first battery 20, although the two batteries 20 and 30 have the same output voltage levels.

Figure 3:
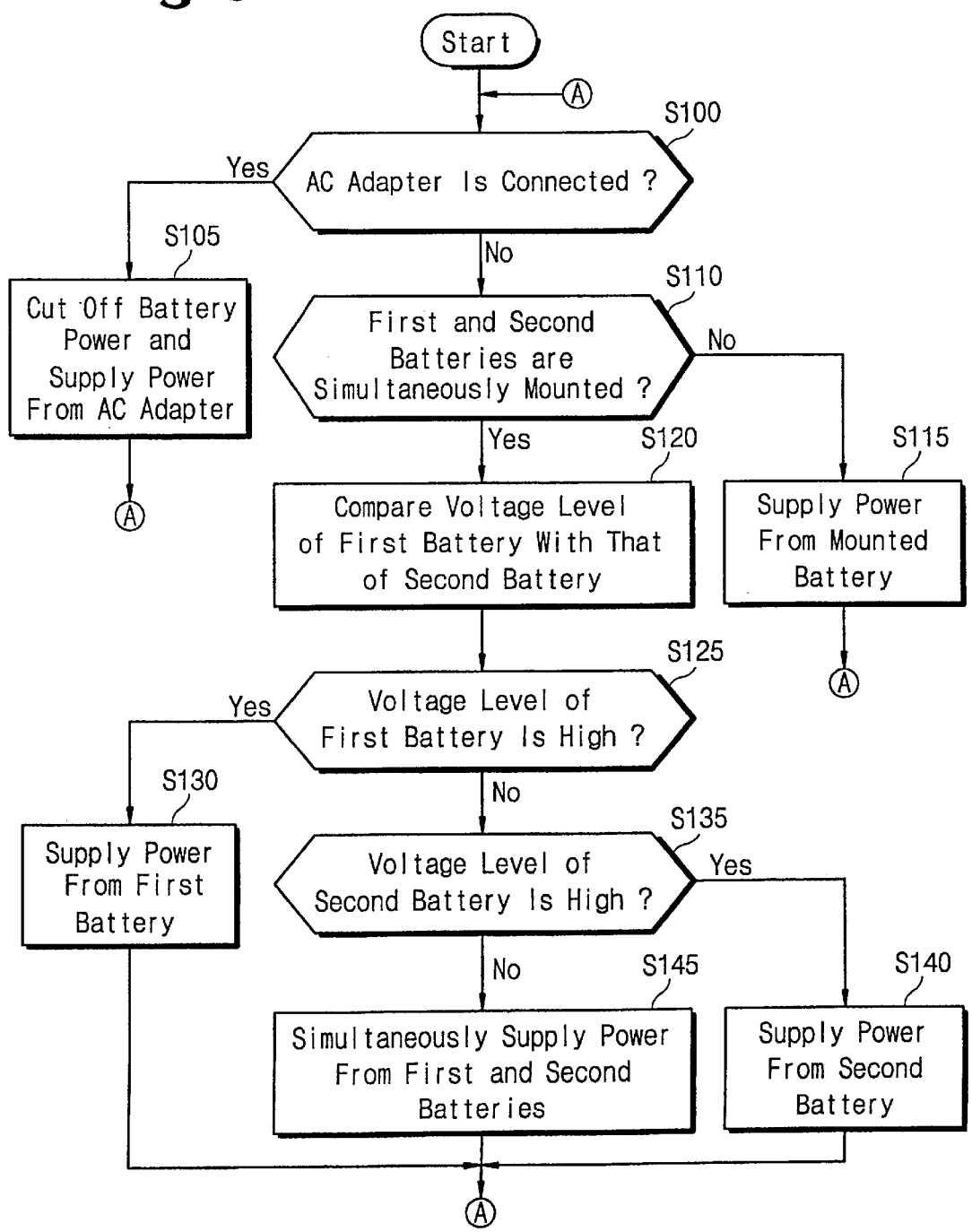
FIG. 3 is a flowchart illustrating a method for controlling power supply to a battery-powered electronic device in accordance with the present invention.

FIG. 3 is a flowchart showing a method of controlling power in a battery-powered electronic device in accordance with the present invention. Referring to FIG. 3, as well as to FIGS. 1 and 2, in step S100, it is determined whether AC adapter 10 is connected to the electronic device 1. If so, the control flow proceeds to step S105 and in step S105, battery power from any of the first battery 20 and second battery 30 is cut off and the AC adapter 10 supplies power to the electronic device 1; and the control flow then returns to step S100, as indicated be the letter "A". If not so, control flow proceeds to step S110 wherein it is determined whether the first and the second batteries 20 and 30 are simultaneously mounted in or electrically connected to electronic device 1. If only one of the batteries 20 and 30 is mounted in or electrically connected to electronic device 1, the control flow proceeds to step S115 wherein the electronic device is supplied with power from the mounted or connected one of the first and second batteries 20 and 30; and the control flow then returns to step S100, as indicated be the letter "A". If both batteries 20 and 30 are simultaneously mounted on the electronic device 1, the control flow proceeds to step S120. In this step S120, an output voltage level Vbat1 of the first battery 20 is compared with an output voltage level Vbat2 of the second battery 30. Thereafter, at step 125, it is determined whether the output voltage level Vbat1 of the first battery 20 is relatively higher than the output voltage level Vbat2 of the second battery 30. If so, the control flow proceeds to step S130 wherein the first battery 20 supplies power to the electronic device 1; and then the control flow returns to step S100, as indicated by the letter "A". If not, the control flow proceeds to step S135 wherein it is determined whether the voltage level Vbat2 of the second battery 30 is relatively higher than the voltage level Vbat1 of the first battery 20. If so, the control flow proceeds to step S140 wherein the electronic device 1 is supplied with power from the second battery 30; and then the control flow returns to step S100, as indicated by the letter "A". In step S135, if the voltage levels Vbat1 of the first battery 20 and Vbat2 of the second battery 30 are relatively identical or substantially identical to each other, the control flow proceeds to step S145. In this step S145, the electronic device 1 is supplied with power simultaneously from both the first battery 20 and the second battery 30; and then the control flow returns to step S100, as indicated by the letter "A".

According to the present invention, in an electronic device having two batteries, one battery having a relatively higher voltage level is discharged in advance of the other battery, and then both of the two batteries are simultaneously discharged when their output voltages become identical or substantially identical, thereby preventing a decrease in the usage time of the batteries due to different output voltages of two batteries.

While there has been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying our the present invention, but that the present invention includes all embodiments falling within the scope of the appended claims.

What is claimed is:

1. An electronic device, comprising:
   a main circuit power input terminal for supplying power to a main circuit of the electronic device from any of a first battery and a second battery;
   a battery control circuit, said battery control circuit responsive to an output voltage of said first battery, when said first battery is connected to said electronic device, and responsive to an output voltage of said second battery, when said second battery is connected to said electronic device, for generating a corresponding battery selection control signal dependent upon an output voltage level of said first battery and an output voltage level of said second battery; and
   a battery selection circuit, said battery selection circuit for electrically connecting one of said first battery and said second battery that has a relatively higher output voltage level than the other of said first battery and said second battery to said main circuit power input terminal in response to the corresponding battery selection control signal when both of said first battery and said second battery are connected to the electronic device.

2. The electronic device of claim 1, further comprised of said battery selection circuit comprising:
   a first switch circuit which is positioned for connection between said first battery and said main circuit power input terminal, and is selectively turned on and off in response to the corresponding battery selection control signal; and
   a second switch circuit which is positioned for connection between said second battery and said main circuit power input terminal, and is selectively turned on and off in response to the corresponding battery selection control signal.

3. The electronic device of claim 2, further comprising an adapter detection circuit for detecting an alternating current adapter when connected to said main circuit power input terminal to generate an adapter detection signal to cut off any power supplied to the electronic device by any of said first battery and said second battery so that power is then supplied to the electronic device by said alternating current adapter.

4. The electronic device of claim 3, further comprised of said battery selection circuit further comprising a third switch circuit which is connected to said main circuit power input terminal and is connected between said first switch circuit and said second switch circuit, and said third switch circuit is selectively turned on and off in response to the adapter detection signal to selectively provide and cut off any power supplied to the electronic device by any of said first battery and said second battery.

5. The electronic device of claim 3, further comprised of said first switch circuit and said second switch circuit are turned off in response to the adapter detection signal when said alternating current adapter is connected to said main circuit power input terminal.

6. The electronic device of claim 1, further comprised of said battery control circuit comprising:
   a first voltage divider for dividing the output voltage of said first battery and providing a first divided voltage;
   a second voltage divider for dividing the output voltage of said second battery and providing a second divided voltage; and
   a comparator for comparing the first divided voltage with the second divided voltage and generating the corresponding battery selection control signal depending upon a result of the comparison of the first divided voltage with the second divided voltage.

7. The electronic device of claim 1, further comprising a battery voltage detection circuit which is positioned for connection to said first battery and to said second battery, and said battery voltage detection circuit for generating a corresponding low voltage detection signal when the output voltage level of said first battery is lower than a predetermined value and for generating the corresponding low voltage detection signal when the output voltage level of said second battery is lower than the predetermined value, and said battery voltage detection circuit for then providing the corresponding low voltage detection signal to the main circuit to warn a user of a low battery condition.

8. The electronic device of claim 7, further comprised of said battery voltage detection circuit comprising:
   a low voltage detector for outputting the corresponding low voltage detection signal when an input voltage level to said low voltage detector from any of said first battery and said second battery is lower than the predetermined value;
   a first diode positioned for connection between a voltage input terminal of said low voltage detector and said first battery; and
   a second diode positioned for connection between the voltage input terminal of said low voltage detector and said second battery.

9. The electronic device of claim 7, further comprised of said battery selection circuit comprising:
   a first switch circuit which is positioned for connection between said first battery and said main circuit power input terminal, and said first switch circuit is selectively turned on and off in response to the corresponding battery selection control signal; and
   a second switch circuit which is positioned for connection between said second battery and said main circuit power input terminal, and said second switch circuit is selectively turned on and off in response to the corresponding battery selection control signal.

10. The electronic device of claim 9, further comprised of said battery control circuit comprising:
   a first voltage divider for dividing the output voltage of said first battery and providing a first divided voltage;
   a second voltage divider for dividing the output voltage of said second battery and providing a second divided voltage; and
   a comparator for comparing the first divided voltage with the second divided voltage and generating the corresponding battery selection control signal depending upon a result of the comparison of the first divided voltage with the second divided voltage.

11. The electronic device of claim 9, further comprised of said battery voltage detection circuit comprising:
   a low voltage detector for outputting the corresponding low voltage detection signal when an input voltage level to said low voltage detector from any of said first battery and said second battery is lower than the predetermined value;
   a first diode positioned for connection between a voltage input terminal of said low voltage detector and said first battery; and
   a second diode positioned for connection between the voltage input terminal of said low voltage detector and said second battery.

12. The electronic device of claim 11, further comprised of said battery selection circuit further comprising a diode connected to one end and to another end of said first switch circuit, and said battery voltage detection circuit further comprises a switch circuit which is positioned for connection between said first diode and said first battery and is selectively turned on and off in response to the corresponding battery selection control signal, and with said first switch circuit of said battery selection circuit and said switch circuit of said battery voltage detection circuit being selectively turned on and off together in response to the corresponding battery selection control signal.

13. The electronic device of claim 12, further comprised of said battery control circuit comprising:
   a first voltage divider for dividing the output voltage of said first battery and providing a first divided voltage;
   a second voltage divider for dividing the output voltage of said second battery and providing a second divided voltage; and
   a comparator for comparing the first divided voltage with the second divided voltage and generating the corresponding battery selection control signal depending upon a result of the comparison of the first divided voltage with the second divided voltage.

14. The electronic device of claim 12, further comprising an adapter detection circuit for detecting an alternating current adapter when connected to said main circuit power input terminal to generate an adapter detection signal to cut off any power supplied to the electronic device by any of said first battery and said second battery so that power is supplied to the electronic device by said alternating current adapter, and
   further comprised of said battery selection circuit further comprising a third switch circuit which is connected to said main circuit power input terminal and connected between said first switch circuit and said second switch circuit, and said third switch circuit is selectively turned on and off in response to the adapter detection signal to selectively provide and cut off any power supplied to the electronic device by any of said first battery and said second battery.

15. The electronic device of claim 14, further comprised of said first switch circuit and said second switch circuit are turned off in response to the adapter detection signal when said alternating current adapter is connected to said main circuit power input terminal.

16. The electronic device of claim 14, further comprised of said battery control circuit comprising:
   a first voltage divider for dividing the output voltage of said first battery and providing a first divided voltage;
   s a second voltage divider for dividing the output voltage of said second battery and providing a second divided voltage; and
   a comparator for comparing the first divided voltage with the second divided voltage and generating the corresponding battery selection control signal depending upon a result of the comparison of the first divided voltage with the second divided voltage.

17. The electronic device of claim 1, further comprised of said battery selection circuit for electrically connecting both of said first battery and said second battery to said main circuit power input terminal in response to the corresponding battery selection control signal when the output voltage level of said first battery is substantially identical to the output voltage level of said second battery and both of said first battery and said second battery are connected to the electronic device.

18. The electronic device of claim 1, further comprised of said battery selection circuit for electrically connecting one of said first battery and said second battery to said main circuit power input terminal in response to the corresponding battery selection control signal when only one of said first battery and said second battery is connected to the electronic device.

19. An electronic device, comprising:
   a main circuit power input terminal for supplying power to a main circuit of the electronic device;
   a first battery and a second battery;

a battery control circuit, said battery control circuit responsive to an output voltage of said first battery and to an output voltage of said second battery, for generating a battery selection control signal dependent upon an output voltage level of said first battery and an output voltage level of said second battery; and a battery selection circuit, said battery selection circuit for electrically connecting one battery of said first battery and said second battery that has a relatively higher output voltage level than the other of said first battery and said second battery to said main circuit power input terminal in response to the battery selection control signal.

20. A method of controlling power supply to a battery-powered electronic device, comprising the steps of:

determining whether a first battery and a second battery are simultaneously connected to said electronic device;

supplying power to said electronic device from a connected one of said first battery and said second battery, when one of said first battery and said second battery is solely connected to said electronic device;

comparing an output voltage level of said first battery with an output voltage level of said second battery, when said first battery and said second battery are simultaneously connected to said electronic device; and supplying power to said electronic device from one of said first battery and said second battery that has a relatively higher output voltage level that the other of said first battery and said second battery as a result of said comparing step.

21. The method of claim 20, further comprising the step of: simultaneously supplying power to said electronic device from both of said first battery and said second battery when the output voltage level of said first battery and the output voltage level of said second battery are substantially identical as a result of said comparing step.

22. The method of claim 21, further comprising the steps of:

determining whether an alternating current adapter is connected to said electronic device; and cutting off any power supplied from said first battery and said second battery to said electronic device when said alternating current adapter is connected to said electronic device.

* * * * *